United States Patent [19]

Gupta et al.

[11] Patent Number: 4,881,314

[45] Date of Patent: Nov. 21, 1989

[54] METHOD OF EXPLOSIVELY FORMING A MULTILAYERED COMPOSITE MATERIAL

[75] Inventors: Suresh K. Gupta, Alpharetta; John T. Pinder, Marietta, both of Ga.

[73] Assignee: Rolls Royce, Inc., Greenwich, Conn.

[21] Appl. No.: 248,188

[22] Filed: Sep. 23, 1988

[51] Int. Cl.⁴ .................... B23P 17/04; B23K 20/08
[52] U.S. Cl. .................................... 29/421.2; 228/107
[58] Field of Search .............. 29/421.2; 228/107, 108, 228/109, 190

[56] References Cited

U.S. PATENT DOCUMENTS

| | | | |
|---|---|---|---|
| 3,165,826 | 1/1965 | Bentov | 29/421.2 X |
| 3,261,088 | 7/1966 | Holtzman | 228/108 |
| 3,419,951 | 1/1969 | Carlson | 29/421.2 X |
| 3,614,827 | 10/1971 | Knop et al. | 228/107 |
| 3,737,976 | 6/1973 | Lieberman et al. | 228/109 |
| 4,612,259 | 9/1986 | Ueda | 228/107 X |
| 4,713,871 | 12/1987 | Araki et al. | 29/421.2 |

Primary Examiner—P. W. Echols
Assistant Examiner—Peter Dungba Vo
Attorney, Agent, or Firm—Oliff & Berridge

[57] ABSTRACT

A method of forming composite materials comprising reinforced fibres, such as carbon fibres 12, embedded in a metal matrix 10, 13. The method comprises forming a first metal sheet 10, laying the reinforcing fibres 12 on the first sheet 10, and explosively forming a second sheet 13 around the fibres to form an explosively joined composite.

2 Claims, 1 Drawing Sheet

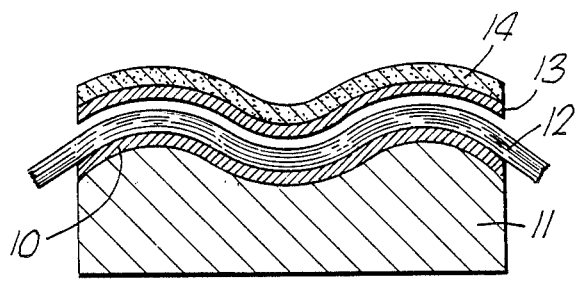

METHOD OF EXPLOSIVELY FORMING A MULTILAYERED COMPOSITE MATERIAL

BACKGROUND OF THE INVENTION

This invention relates to a method of manufacturing composite materials comprising a matrix in which reinforcing material such as continuous fibres are embedded.

A major problem encountered in the production of metal matrix composites relates to the reactivity of the metal matrix with the reinforcing material during manufacture. This is particularly a problem where the fibres are carbon fibres. In some methods of manufacture, molten metal is poured over, or contacts, the fibres. In other prior known methods the matrix material and the reinforcing fibres are consolidated together for sufficient times at elevated pressures and temperatures to cause a significant reaction to take place between the fibres and the matrix.

There are other processes such as high temperature vapour deposition of metal on to carbon fibres or diffusion bonding of a metal matrix to the fibres where there is a chemical reaction between the fibres and the metal matrix.

In all of the known methods of manufacture the chemical reaction between the metal matrix and the fibres is unacceptable because it deleteriously lowers the strength of the composite and can degrade the fibres to an extent that the composite is of inferior quality.

SUMMARY OF THE INVENTION

An object of the present invention is to provide a method of manufacturing a composite material comprising a metal matrix and reinforcing fibres in which the chemical reaction between the matrix and the fibres is at least reduced to an acceptable level.

The invention as claimed achieves this objective by employing an explosive welding step which is essentially a low temperature bonding technique.

An embodiment of the invention will be described, by way of an example, with reference to the accompanying drawing which illustrates, schematically, one way of manufacturing a composite in accordance with the present invention.

BRIEF DESCRIPTION OF THE DRAWING

FIG. 1 is a schematic cross-section illustrating an embodiment of the invention.

DETAILED DESCRIPTION OF THE INVENTION

Referring to the drawing, the metal matrix is formed by fabricating a first sheet 10 of metal which is to form the matrix and laying the sheet on to a suitably shaped anvil 11. One or more layers of reinforcing carbon fibres 12, which lie in preferred directions or is in the form of a woven mat, is laid on to the first sheet 10 of metal. Care is taken to ensure that the face of the sheet 10 in contact with the carbon fibres 12, and the carbon fibres themselves are clean and free from contaminants. A second sheet 13 of metal is located a small distance away from the layer, or layers 11. An explosive charge 14 is laid in contact with the sheet 13 on the side remote from the fibres 12.

The composite is formed by detonating the explosive 14 so as to cause the sheet 13 to be accelerated towards, and impact with, the fibres 12 and the sheet 10, and thereby explosively form the sheets 10 and 13 around the fibres and form an explosively welded composite.

The sheets 10, 13 and the layers of fibres 12 may be of complementary shapes so as to form a shaped composite.

The metal sheets 10, 13 may be conventional metal sheets or they could conceivably be green compacts comprising powdered metal particles bonded in a suitable binder. In this latter case the explosively formed composite could be sintered after forming, at a temperature which would keep the reaction of the metal matrix and carbon fibres as low as possible.

If it is desired to control the chemical reaction between the metal matrix and the reinforcing fibres the composite can be heat treated in a carefully controlled manner to achieve the desired result after the explosive bonding step.

We claim:

1. A method of manufacturing a multilayered composite material in which reinforcing fibres are embedded in a metal matrix, the method comprising the steps of providing in contact with an anvil a first metal layer consisting of a green compact of powdered metal particles bonded together by means of a suitable binder, laying at least one layer of reinforcing fibres onto said first metal layer, locating adjacent the fibres a second metal layer, providing an explosive charge adjacent the second layer consisting of a green compact of powdered metal particles or a metal bonded together by means of a suitable binder, on the side of the second layer remote from the fibres, detonating the explosive thereby to explosively form the second layer around the fibres and join the first and second layers and the fibres together, and subsequently sintering the explosively formed composite at a temperature below the reaction temperature of metal in said first and second metal layers with the material of the reinforcing fibres to reduce unwanted chemical reaction between said metal layers and said fibres layer.

2. A method as claimed in claim 1 wherein the anvil is shaped according to the required final shape of the composite material.

* * * * *